(12) United States Patent
Low et al.

(10) Patent No.: US 9,908,499 B2
(45) Date of Patent: Mar. 6, 2018

(54) CURTAIN AIRBAG ASSEMBLY WITH STIFFENING CHAMBER

(71) Applicant: Autoliv ASP, Inc., Ogden, UT (US)

(72) Inventors: Jeffrey Eugene Low, Layton, UT (US); Kurt Lawrence Gammill, Layton, UT (US)

(73) Assignee: Autoliv ASP, Inc., Ogden, UT (US)

( * ) Notice: Subject to any disclaimer, the term of this patent is extended or adjusted under 35 U.S.C. 154(b) by 75 days.

(21) Appl. No.: 15/051,494

(22) Filed: Feb. 23, 2016

(65) Prior Publication Data

US 2017/0240131 A1    Aug. 24, 2017

(51) Int. Cl.
  *B60R 21/16*    (2006.01)
  *B60R 21/2334*    (2011.01)
  *B60R 21/232*    (2011.01)
  *B60R 21/233*    (2006.01)

(52) U.S. Cl.
  CPC ........ *B60R 21/2334* (2013.01); *B60R 21/232* (2013.01); *B60R 21/233* (2013.01); *B60R 2021/23324* (2013.01)

(58) Field of Classification Search
  CPC . B60R 21/213; B60R 21/232; B60R 21/2338; B60R 2021/23386
  USPC ..................................................... 280/730.2
  See application file for complete search history.

(56) References Cited

U.S. PATENT DOCUMENTS

| | | | |
|---|---|---|---|
| 6,042,141 A * | 3/2000 | Welch ................... | B60R 21/232 280/729 |
| 6,220,625 B1 | 4/2001 | Wallner et al. | |
| 6,224,091 B1 * | 5/2001 | Eyrainer ............... | B60R 21/213 280/730.2 |
| 6,846,010 B2 * | 1/2005 | Enders .................. | B60R 21/232 280/729 |
| 7,077,425 B2 * | 7/2006 | Ogawa .................. | B60R 21/213 280/730.2 |
| 8,382,151 B2 * | 2/2013 | Kalandek ............. | B60R 21/232 280/728.2 |
| 8,485,549 B2 * | 7/2013 | Yamamura ............ | B60R 21/213 280/729 |
| 8,636,301 B1 * | 1/2014 | Wang .................... | B60R 21/232 280/730.2 |
| 9,211,863 B2 * | 12/2015 | Kashio .................. | B60R 21/232 |
| 9,610,916 B2 * | 4/2017 | Kawamura ........... | B60R 21/232 |
| 2002/0014762 A1 * | 2/2002 | Bakhsh ................. | B60R 21/232 280/730.2 |
| 2004/0007857 A1 | 1/2004 | Sonnenberg et al. | |
| 2006/0208466 A1 * | 9/2006 | Kirby .................... | B60R 21/232 280/730.2 |
| 2009/0218798 A1 | 9/2009 | Gamer | |
| 2010/0264630 A1 | 10/2010 | Walston | |
| 2012/0025500 A1 * | 2/2012 | Yamamura ............ | B60R 21/213 280/730.2 |

* cited by examiner

*Primary Examiner* — Toan To
(74) *Attorney, Agent, or Firm* — Stoel Rives LLP (57) ABSTRACT

A curtain airbag assembly that includes one or more angled stiffening chambers and one or more standoff chambers. An angled stiffening chamber may be configured to support and retain an occupant within a vehicle during or after a vehicle collision. The angled stiffening chamber may include a plurality of extending portions and bent portions such that the angled stiffening chamber, when inflated, has an angled or bent configuration.

18 Claims, 9 Drawing Sheets

CURTAIN AIRBAG ASSEMBLY WITH STIFFENING CHAMBER

TECHNICAL FIELD

The present disclosure relates generally to the field of automotive protective systems. More specifically, the present disclosure relates to inflatable airbag cushion assemblies.

BACKGROUND

Airbags are often mounted to a vehicle and deploy so as to prevent an occupant from impacting vehicular structures and/or to prevent an occupant from being ejected from a vehicle in a collision or roll-over. In some instances, the airbags can suffer from one or more drawbacks or may perform less than optimally in one or more respects. Certain embodiments disclosed herein can address one or more of these issues.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The phrases "connected to" and "coupled to" are used in their ordinary sense, and are broad enough to refer to any suitable coupling or other form of interaction between two or more entities, including mechanical and fluid interaction. Two components may be coupled to each other even though they are not in direct contact with each other. The phrase "attached to" refers to interaction between two or more entities which are in direct contact with each other and/or are separated from each other only by a fastener of any suitable variety (e.g., mounting hardware or an adhesive). The phrase "fluid communication" is used in its ordinary sense, and is broad enough to refer to arrangements in which a fluid (e.g., a gas or a liquid) can flow from one element to another element when the elements are in fluid communication with each other. The term "longitudinal" refers to an axis, orientation, or direction that extends from the rear of the vehicle to the front of the vehicle, or vice versa. A "structural element" of a vehicle refers to a beam at the bottom of a vehicle window (e.g., trim immediately below the window), a roof rail, or a vehicle pillar (e.g., an A-pillar, B-pillar, C-pillar, or D-pillar).

Inflatable airbag systems are widely used to reduce or minimize occupant injury in a collision scenario. Airbag modules have been installed at various locations within a vehicle, including, but not limited to, the steering wheel, the instrument panel, within the side doors or side seats, adjacent to the roof rail of the vehicle, in an overhead position, or at the knee or leg position. Specific reference is made herein to curtain airbags, although the principles discussed herein may apply to other types of airbags as well.

Curtain airbags are often deployed from adjacent the roof rail of a vehicle and, when inflated, extend along the side of the vehicle between the occupant and the side panels and/or windows of the vehicle to protect an occupant (and in particular, an occupant's head) during a collision event. Curtain airbags may be packaged in a folded and/or rolled state and held in the packaged configuration by a restraint, such as a sleeve or sock. During deployment, the curtain airbag may expand and burst free from the restraint to cover at least a portion of a side window and a structural element (e.g., a pillar) of the vehicle. In some embodiments, curtain airbags may cover one or more of the A-, B-, C-, and D-pillars of a vehicle. For example, in some embodiments, a deployed curtain airbag may extend from the A-pillar to the C-pillar of the vehicle. In other embodiments, a deployed curtain airbag may extend from the A-pillar to the D-pillar of the vehicle. Other configurations are also possible.

In a collision event, the curtain airbag may be inflated by an inflator and change conformation from being rolled and/or folded in the packaged or undeployed state to being extended and/or inflated in a deployed state. Whether rolled or folded in the packaged state, the curtain airbag is generally in an uninflated state and a flat state (e.g. a minimal depth or thickness in a direction perpendicular to a longitudinal axis and to panels forming the curtain airbag) prior to packaging in the packaged state. Accordingly, inflation of the curtain airbag causes the curtain airbag to transform from the flat state to an inflated state, which is a more rounded state with increased depth. Pressure of the inflation gases expanding the depth of the curtain airbag can cause kinking or buckling in chambers of the curtain airbag as a length (as measured in a direction along a longitudinal axis) of the curtain airbag, or at least one edge (e.g., the bottom edge) of the curtain airbag, shrinks to accommodate expansion of the depth. In particular, chambers of a curtain airbag that extend longitudinally in a direction along a length of the curtain airbag tend to buckle as the curtain airbag inflates and the depth of the curtain airbag expands and the length of the airbag shrinks to accommodate the expansion of the depth. The directionality of the buckling can be unpredictable and may include buckling in any direction perpendicular to the longitudinal axis of the curtain airbag (e.g., an up or down direction along a height of the curtain airbag, or an inboard or outboard direction along a depth of the curtain airbag, or any combination of up, down, inboard, or outboard). Certain embodiments disclosed herein may be less prone to buckling or deformation caused by inflation gas pressure than some curtain airbags known in the prior art.

In some embodiments, an amount of gas from the inflator that is retained within the curtain airbag determines how hard or soft the cushioning of the curtain airbag will be. Other factors may also affect the cushioning properties of the curtain airbag.

Some curtain airbags may be configured to both cushion an occupant and prevent ejection of the occupant from the vehicle. For example, during a collision event, the curtain may cushion the head and upper body of an occupant, and during a roll-over event, the cushion may function to retain the occupant within the vehicle. Stated differently, curtain airbags may decrease a risk of occupant ejection by forming a barrier between the occupant and the side window openings.

During some vehicle collisions or roll-overs, one or more side windows of the vehicle may break or shatter, creating an opening in a side of the vehicle through which an occupant could be ejected from the vehicle. A curtain airbag that, when deployed, covers the window opening can retain the occupant inside the vehicle and decrease the likelihood of occupant ejection. In addition to buckling caused by pressure of inflation gases described above, some curtain airbags may be prone to buckling upon occupant contact, or otherwise allow for substantial deformation at certain areas or "contact points" across the airbag, thereby providing inadequate protection to occupants in the vehicle. Certain embodiments disclosed herein may be less prone to buckling or deformation than some curtain airbags known in the prior art.

The National Highway Traffic Safety Administration (NHTSA) evaluates curtain airbag performance through a number of tests, including a test in which a head form contacts a deployed curtain airbag installed in a vehicle shell at a number of pre-determined test points and with a pre-determined contact force. The NHTSA then measures the excursion of the head form outside the vehicle shell. If the head form excurses more than a pre-determined amount, the airbag fails the test. Some curtain airbags may buckle (such as by bending or giving way under pressure or strain) or otherwise deform at one or more of the pre-determined test points upon occupant contact, thereby allowing the head form to excurse beyond the pre-determined threshold. Some curtain airbag are prone to buckling (bending or giving way) in response to pressure of inflation gases expanding chambers from a flat state to an inflated state, as described above. Some curtain airbags disclosed herein may perform better under these conditions than airbags in the prior art.

Presently available curtain airbags attempting to address the above mentioned NHTSA tests, and to otherwise limit or prevent occupant head excursion through a side window opening, have sometimes employed horizontal beam chambers (e.g., an elongate cylindrical chamber configured to form a stiff beam of air horizontally across a window opening). However, these presently available horizontal beam chambers are particularly prone to kinking and buckling during deployment due to pressure of inflation gases. As described above, expansion of a horizontal beam chamber expands a depth of the curtain airbag. Properties of the materials from which airbags are constructed are such that the materials tend not to stretch as much as may accommodate an increase in the depth of the curtain airbag without a corresponding decrease in a length and/or height of the curtain airbag. The horizontal beam chamber in a flat state has a zero or very small depth, a given height, and a given length. During inflation of the curtain airbag, the horizontal beam chamber expands and the depth increases. As a result, the material of the airbag compensate by shrinking in one or more of the height and length dimensions. As a result, kinking or buckling can occur. The kinking or buckling is unpredictable and can be in any direction perpendicular to the longitudinal axis of the curtain airbag (e.g., an up or down direction along a height of the curtain airbag, or an inboard or outboard direction along a depth of the curtain airbag, or any combination of up, down, inboard, or outboard). The kinking or buckling can be more pronounced within a horizontal beam chamber positioned toward a bottom edge of a curtain airbag because often a top edge is secured to a vehicle structure or otherwise limited in shrinking, while the bottom edge of a curtain airbag can be more difficult to secure and more prone to shrinking in a length dimension during inflation. When the kinking or buckling results in the airbag excursing out of the vehicle, or otherwise failing to provide sufficient support to receive and limit excursion of a head of an occupant during a collision, the airbag can fail safety tests and requirements.

In some embodiments of the present disclosure, a curtain airbag may include one or more stiffening chambers and/or one or more stiffener adjusting regions at certain areas within the curtain airbag. The support and/or rigidity provided by such curtain airbags may prevent certain areas of the curtain airbag from buckling or otherwise improperly deforming when receiving an occupant. Moreover, the stiffening chambers and/or the stiffener adjusting regions may direct or control kinking or buckling due to inflation gas pressure as the curtain airbag expands from a flat state to an inflated state, thereby expanding a depth of the curtain airbag and causing a length of the curtain airbag to shrink (at least along one edge of the curtain airbag).

Figure 1A:
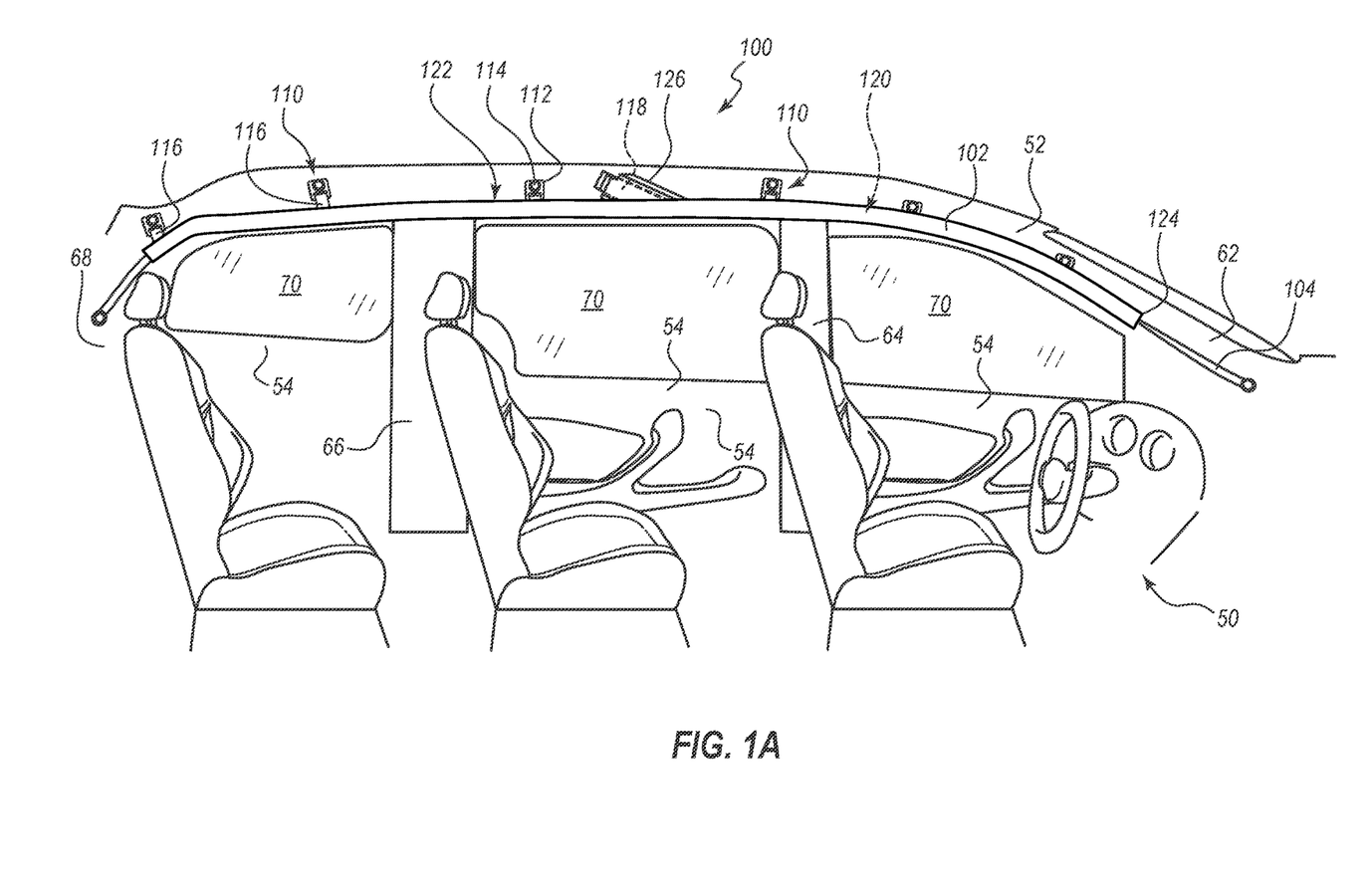
FIG. 1A is a side view of an interior of a vehicle with a curtain airbag assembly in an undeployed state.
Figure 1B:
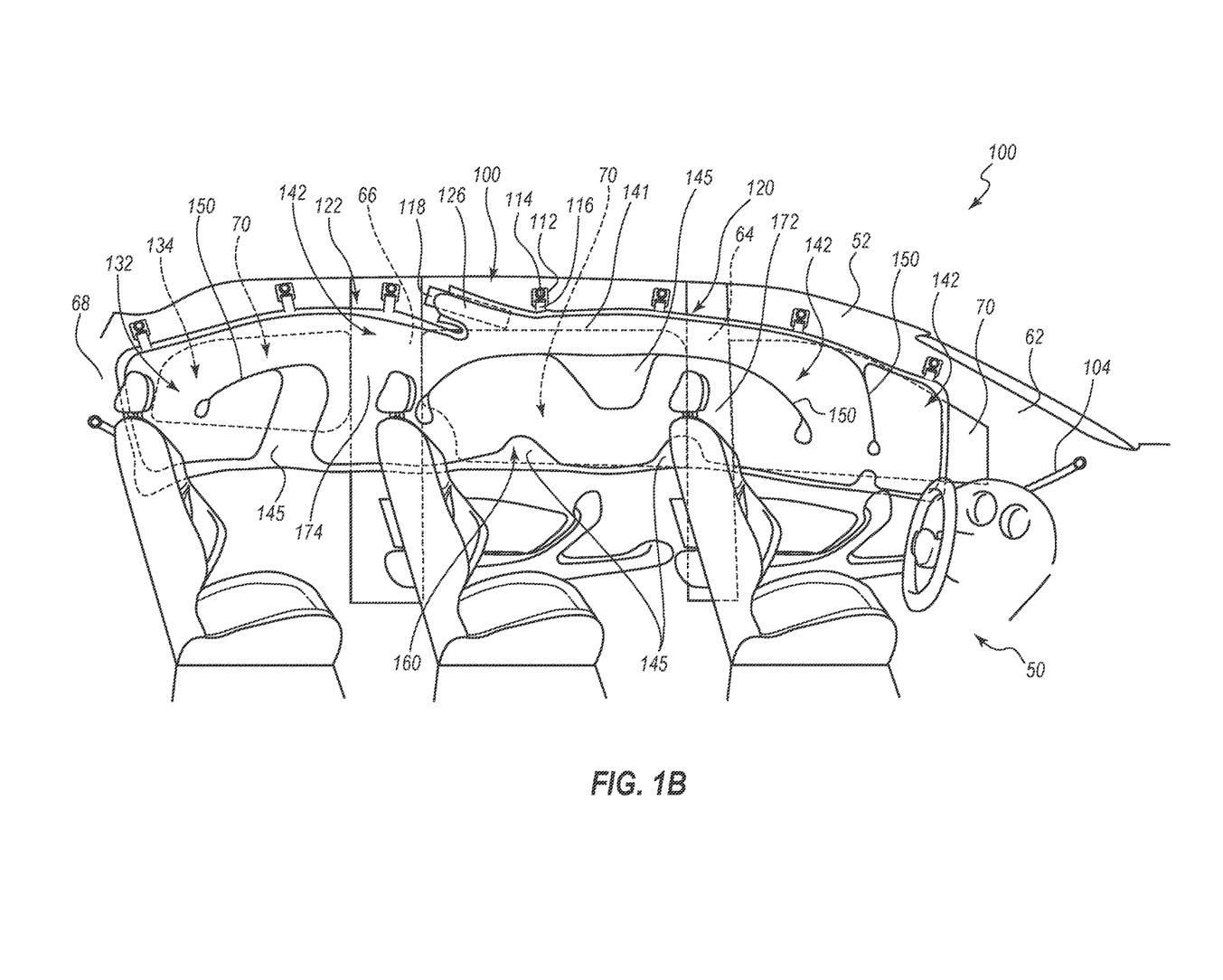
FIG. 1B is a side view of the interior of the vehicle of FIG. 1A, with the curtain airbag assembly in a deployed state.

FIGS. 1A and 1B depict an embodiment of a curtain airbag assembly 100 mounted within a vehicle 50. In FIG. 1A, the airbag assembly 100 is in a packaged configuration, whereas in FIG. 1B, the assembly 100 is in a deployed configuration. The airbag assembly 100 extends a length, which is in a direction forward and rearward with respect to the vehicle 50 in the illustrated embodiment. The airbag assembly 100 has a height in a direction up and down with respect to the vehicle 50. The airbag assembly also has a depth in a direction in and out of the page of FIGS. 1A and 1B.

With reference to FIGS. 1A and 1B, the assembly 100 can include a curtain airbag 120, which can be secured to the vehicle 50 in any suitable manner. In the illustrated embodiment of FIG. 1A, the curtain airbag 120 is positioned at an interior of a restraint 102 so as to be retained in a packaged configuration. The restraint 102 may be of any suitable variety, and may include one or more straps, tethers, socks, and/or sleeves. In the illustrated embodiment, the restraint 102 includes a sleeve that extends along substantially a full length of the curtain airbag 120, such that a majority of the curtain airbag 120 is obscured from view by the sleeve in FIG. 1A.

The curtain airbag assembly 100 can be attached to the vehicle 50 in any suitable manner. For example, in some embodiments, the curtain airbag assembly 100 includes one or more fastening assemblies 110 that are configured to secure one or more of the curtain airbag 120 and the restraint 102 to the vehicle 50. The inflatable airbag assembly 100 can be mounted inside the vehicle 50 adjacent to a roof of the vehicle, such as to a roof rail 52. In the illustrated embodiment, each fastening assembly 110 includes a tether or strap 116 that is secured to mounting hardware, such as a tab 112 that is secured to the roof rail 52 via a fastener 114, such as a bolt. Any other suitable fastening arrangement is contemplated. Each strap 116 may be coupled to one or more of the curtain airbag 120 and the restraint 102 in any suitable manner.

A forward end of the inflatable airbag assembly 100 can include a strap 104, which may be secured to the vehicle 50 in any suitable manner. For example, in the illustrated embodiment, the strap 104 is attached to a lower end of an A-pillar 62. As shown in FIGS. 1A and 1B, the strap 104 can be attached to a forward end 124 of the curtain airbag 120. An upper end 122 of the curtain airbag 120 can be attached to the straps 116. In some embodiments, the straps 116 are sewn to the curtain airbag 120. In other embodiments, the straps 116 may be integrally formed with the curtain airbag 120.

The fastening assemblies 110 and/or strap 104 may aid to maintain a length of the curtain airbag 120 at least along a top edge. The fastening assemblies 110 and/or strap 104 may restrain a shrinking in length of at least the top edge of the curtain airbag 120 that occurs to accommodate expansion of the depth of the curtain airbag 120 due to pressure of inflation gas filling the curtain airbag 120.

The airbag assembly 100 can further include an inflator 118, which may be positioned within a throat 126 of the curtain airbag 120. The inflator 118 may be anchored to the roof rail 52, and may be of any suitable variety. In some embodiments, the inflator 118 includes either a pyrotechnic device or a stored gas inflator. The inflator 118 can be in electronic communication with one or more vehicle sensors which are configured to detect vehicle collisions and/or roll-overs. Upon detection of predetermined conditions, the sensor(s) can activate the inflator 118, thereby causing rapid inflation of the curtain airbag 120.

With reference to FIGS. 1A and 1B, the curtain airbag 120 can be configured to cover various structures (e.g., windows 70) or structural elements of the vehicle 50 when the curtain airbag 120 is deployed. For example, the curtain airbag 120 depicted in FIGS. 1A and 1B extends a length (along a longitudinal direction) from a forward portion of the vehicle 50 to a rearward portion of the vehicle 50 and is configured to, when deployed, at least partially cover the B-pillar 64, the C-Pillar 66, the D-pillar 68, and the roof rail 52. In some embodiments, the curtain airbag 120, when deployed, is disposed entirely above the bottom of one or more side window(s) 70. Stated otherwise, a height of the curtain airbag 120 when deployed is less than a distance from the roof rail to the bottom of an opening of the one or more side windows 70. In other embodiments, the curtain airbag 120, when deployed, extends no more than 2 inches, 4 inches, or 6 inches below the bottom of the side window(s). In still other embodiments, the curtain airbag 120 may extend more than 6 inches below the bottom of the window(s).

With reference to FIG. 1B, the curtain airbag 120 can define various portions that provide different amounts of cushioning, support, and/or rigidity. In particular, the curtain airbag 120 can include various inflatable cushion chambers 142 or segments that are configured to be filled with inflation gas to cushion and/or restrain a vehicle occupant during a collision event. The inflatable chambers 142 can be configured to deploy at strategic locations within the vehicle 50 to cushion the occupant. The one or more inflatable chambers 142 may include a longitudinal chamber 141 (e.g., a gas entry chamber), an angled stiffening chamber 160, and/or one or more standoff chambers 172, 174. These inflatable chambers 142 can be configured to, when deployed, provide structural rigidity at strategic areas of the curtain airbag 120. Such structural rigidity may reduce buckling or other undesired deformation of the curtain airbag 120 due to pressure of inflation gases expanding a depth of the airbag and/or when a vehicle occupant contacts and/or presses against the curtain airbag 120.

The embodiment depicted in FIG. 1B includes a plurality of inflatable chambers 142. In some embodiments, inflation gas may be retained within one or more inflatable chambers 142 to maintain the inflatable chamber(s) 142 in an inflated or filled configuration, even when a vehicle occupant presses against the inflatable chamber(s) 142. Such an arrangement can allow the inflatable chamber(s) 142 to provide a desired amount of protection to the vehicle occupant.

In some embodiments, the curtain airbag 120 can include one or more non-inflatable regions, of which some are referred to herein as stiffener adjusting regions 145. The stiffener adjusting regions 145 may at least partially adjust and/or define the shape of one or more of the inflatable chambers 142, such as the angled stiffening chamber 160. Stated differently, the one or more stiffener adjusting regions 145 may be positioned between adjacent inflatable chambers 142 or at an interior of an inflatable chamber 142 (e.g., so as to be at least partially surrounded by an inflatable chamber 142). The stiffener adjusting regions 145 may help to limit, direct, or control kinking and/or buckling of the curtain airbag 120, particularly due to pressure of inflation gases expanding a depth of the inflatable chambers 142 of the curtain airbag 120, and in particular expanding a depth of the angled stiffening chamber 160. The stiffener adjusting regions 145 may also provide increased stiffness to the angled stiffening chamber 160 relative to inflated portions.

In some embodiments, at least a portion of one or more of the inflatable chambers 142 and the stiffener adjusting regions 145 can be defined by one or more boundary seams 150. The one or more boundary seams 150 may be formed in any suitable manner. For example, in some embodiments, the one or more boundary seams 150 may include one or more of stitches, welds (e.g., radiofrequency welds), and/or adhesives. In other or further embodiments, the boundary seams 150 may be woven portions that are formed via one-piece weaving techniques. As further discussed below, in some embodiments, the boundary seams 150 may join together two or more pieces of fabric, such as a front face 132 and a rear face 134. In some embodiments, the one or more boundary seams 150 are substantially airtight so as to be able to retain inflation gas within a given inflatable chamber 142. In this manner, the boundary seams 150 may fluidly isolate adjacent inflatable chambers 142 from each other. In other embodiments, the one or more boundary seams 150 may not be airtight, but may instead resist the escape of inflation gas from one or more inflatable chambers 142.

The shape of the curtain airbag 120 and its various components, such as the inflatable chambers 142, angled stiffening chamber 160, and stiffener adjusting regions 145 that are depicted in FIG. 1B, are merely exemplary shapes. These shapes may be altered, such as to accommodate vehicles of different shapes and constructions (e.g., vehicles having fewer or more windows and/or pillars). In some embodiments, the curtain airbag 120 is configured to deploy to cover one or more side window(s) 70 of the vehicle 50. In some embodiments, the curtain airbag 120 may be formed from a contiguous piece of material manufactured using a one-piece woven technique. In other embodiments, the curtain airbag 120 may be manufactured by sewing separate pieces of material (e.g., nylon fabric) together. For example, the front and rear faces 132, 134 may be formed from separate sheets of material that are joined together. In other embodiments, the front and rear faces 132, 134 may be formed from a unitary piece of material.

As can be appreciated from FIGS. 1A and 1B, when the curtain airbag 120 is in the packaged configuration, all components of the curtain airbag 120 can be at an interior of the restraint 102. In the embodiment illustrated in FIG. 1A, the restraint 102 is a sleeve that covers an entirety of the curtain airbag 120. However, in other embodiments, the restraint 102 may merely include a plurality of straps.

Figure 2A:
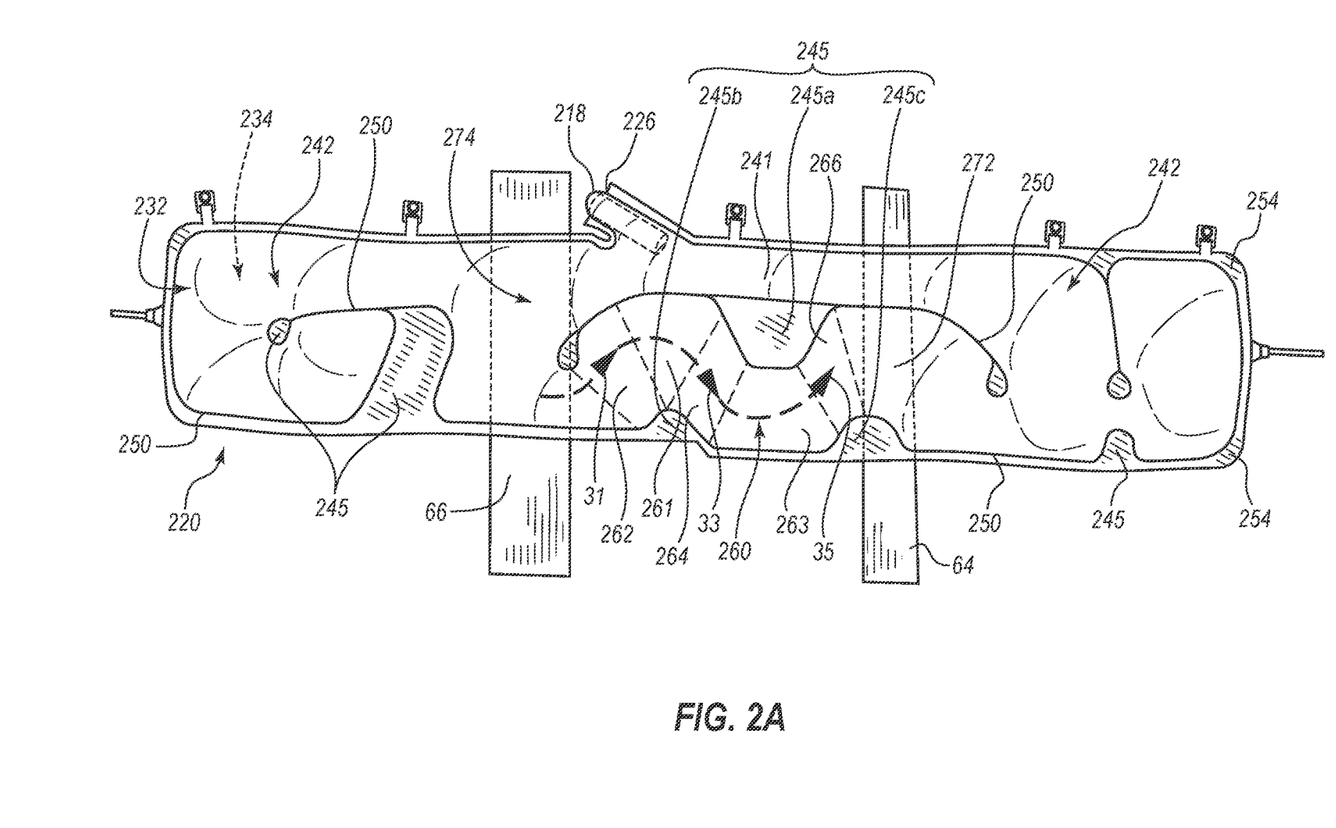
FIG. 2A is a front view of a deployed curtain airbag, according to another embodiment of the present disclosure.

FIG. 2A depicts another embodiment of a curtain airbag 220 that can resemble the curtain airbag 120 described above in certain respects, and that can be compatible with the curtain airbag assembly 100. Accordingly, like features are designated with like reference numerals, with the leading digits incremented to "2." Relevant disclosure set forth above regarding similarly identified features thus may not be repeated hereafter. Moreover, specific features of the curtain airbag 220 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant description of such features applies equally to the features of the curtain airbag 220. Any suitable combination of the features and variation of the same described with respect to the curtain airbag 120 can be employed with the curtain airbag 220, and vice versa. This pattern of disclosure applies equally to further embodiments depicted in subsequent figures and described hereafter, wherein the leading digits may be further incremented.

Referring to FIG. 2A, the curtain airbag 220 has a longitudinal orientation and includes a throat portion 226 near an inflator 218. The throat portion 226 may be configured to receive at least a portion of the inflator 218 therein and/or to be coupled to the inflator 218. As illustrated, the curtain airbag 220 may include a front face 232 and a rear face 234 that meet at one or more edges 254. The front face 232 and the rear face 234 may cooperate to define a void that includes a plurality of inflatable chambers 242 for receiving an inflation gas from the inflator 218. A depth of the airbag at any given point may be measured as a distance between the front face 232 and the rear face 234. In a flat state, the inflatable chambers 242 are empty such that a distance or space between the front face 232 and the rear face 234 is very small. Expansion of the curtain airbag 220 expands the inflatable chambers 242 and thereby increases the depth of the curtain airbag 220 at given points. Pressure of inflation gases filling the inflatable chambers 242 can cause kinking or buckling of the curtain airbag 220 as a length of the curtain airbag 220 (e.g., as measured in a direction from the front to the rear of the vehicle) and/or a height of the curtain airbag 220 (e.g., as measured in a direction from a top to the bottom of the vehicle) shrink or otherwise decrease to compensate for expansion of the depth of the curtain airbag 220.

In the illustrated embodiment, the curtain airbag 220 further includes one or more boundary seams 250 that define the one or more inflatable chambers 242 and the stiffener adjusting regions 245. In the illustrated embodiment, the inflatable chambers 242 are in fluid communication with each other. In other embodiments, one or more of the inflatable chambers 242 may not be in fluid communication with other inflatable chambers 242. The one or more boundary seams 250 may fluidly seal the void of the curtain airbag 220. In yet other embodiments, the one or more boundary seams 250 may not be airtight but may instead resist escape of inflation gas from the void of the curtain airbag 220.

The curtain airbag 220 of FIG. 2A further includes an angled stiffening chamber 260 positioned between and in fluid communication with a first standoff chamber 272 and a second standoff chamber 274. The shapes of the first standoff chamber 272 and the second standoff chamber 274 may be at least partially controlled by a plurality of non-inflatable boundary seams 250 and/or a plurality of non-inflatable stiffener adjusting regions 245a, 245b, 245c. The angled stiffening chamber 260 and standoff chambers 272, 274 may refer to specific inflatable chambers 242, and the stiffener adjusting regions 245a, 245b, 245c may refer to specific non-inflatable regions. The first standoff chamber 272 and second standoff chamber 274 in the illustrated embodiment are configured to deploy to contact (e.g., abut) a B-pillar 64 and a C-pillar 66, respectively. The support and rigidity provided by the standoff chambers 272, 274 and the angled stiffening chamber 260 in conjunction with the B-pillar 64 and C-pillar 66 of the vehicle 50 may reduce the risk of occupant ejection when the curtain airbag 220 receives an occupant during a collision or roll-over event.

As the curtain airbag 220 deploys, the vehicle pillars 64, 66, the roof rail 52, and/or the beam(s) 54 at the bottom of the one or more window(s) 70 (see FIGS. 1A and 1B) may function as load-bearing supports for the standoff chambers 272, 274 and the angled stiffening chamber 260. The angled stiffening chamber 260 and standoff chambers 272, 274 function together as a cross-beam to cushion and protect an occupant who contacts the curtain airbag 220 at or near the angled stiffening chamber 260. The cushioning provided to the occupant may help retain the occupant inside the vehicle 50. It will become apparent that fewer or more standoff chambers may be configured to cooperate with the construction and configuration of a vehicle 50 (e.g., where a vehicle has fewer or more pillars and/or windows). For example, in one embodiment, a curtain airbag may include a single standoff chamber connected to, and in fluid communication with, an angled stiffening chamber. In other embodiments, a curtain airbag may include three or more standoff chambers.

The angled stiffening chamber 260 shown in FIG. 2A is positioned between, and in fluid communication with, a first standoff chamber 272 and a second standoff chamber 274 such that the angled stiffening chamber 260 allows for continuous gas flow from the first standoff chamber 272 to the second standoff chamber 274 (and vice versa) through the angled stiffening chamber 260. The angled stiffening chamber 260, when inflated, can be disposed below a longitudinal chamber 241 which spans longitudinally across the first standoff chamber 272 and the second standoff chamber 274. In other embodiments, the longitudinal chamber 241 may be disposed below, or lateral to, the angled stiffening chamber 260 when inflated.

The angled stiffening chamber 260 includes a plurality of extending portions 262, 264, 266, and bent (e.g., angled) portions 261, 263, wherein the shape of the extending portions 262, 264, 266, and bent portions 261, 263 may be at least partially defined by a plurality of the non-inflatable stiffener adjusting regions 245a, 245b, 245c.

In the embodiment depicted in FIG. 2A, a first bent portion 261 is in fluid communication with and disposed between a first extending portion 262 and a second extending portion 264. When the curtain airbag 220 is deployed, the first extending portion 262 extends in a first direction 31, and the second extending portion 264 extends in a second direction 33. A direction, such as the first direction 31 or the second direction 33 may refer to any vector in three-dimensional space. In the illustrated embodiment, the first direction 31 and second direction 33 may refer to vectors existing on a plane of the stiffener adjustment regions 245.

A second bent portion 263 is in fluid communication with and disposed between the second extending portion 264, and a third extending portion 266 extending in a third direction 35. The third direction 35 may be parallel or generally parallel to the first direction 31. In the illustrated embodiment, the bent portions 261, 263 alternate to define an angle or curve that opens either partially toward a floor of the vehicle 50, or partially toward a roof of the vehicle 50, such that the shape of the angled stiffening chamber 260 somewhat resembles the letter "N." In other embodiments (see, e.g., FIG. 4) in which the angled stiffening chamber is oriented to extend vertically relative to the vehicle 50, the bent portions may alternate to define an angle or curve that opens either partially toward the front of the vehicle 50 or partially toward the rear of the vehicle 50.

When the curtain airbag 220 is inflated, the extending portions 262, 264, 266 may each assume a substantially cylindrical form. The bent portions 261, 263 may be any suitable shape to connect to two or more of: the extending portions 262, 264, 266, other bent portions 263, 261, and/or other inflatable chambers 242. For example, the bent portions 261, 263 may have the shape of an arc, or of a section of a toroid, wherein each end of the bent portions 261, 263 is attached to, and in fluid communication with, another inflatable chamber 242. In other embodiments, the bent portions 261, 263 may have the shape of a point of a triangle, or a trapezoidal shape.

A first stiffener adjusting region 245a, a second stiffener adjusting region 245b, and a third stiffener adjusting region 245c may refer to specific non-inflatable stiffener adjusting regions 245. The shapes of the stiffener adjusting regions 245a, 245b, 245c may at least partially define or adjust various geometric characteristics of the standoff chambers 272, 274, the bent portions 261, 263, and/or the extending portions 262, 264, 266. For example, in the illustrated embodiment, the first stiffener adjusting region 245a partially defines the shapes of the first bent portion 261, the second bent portion 263, the second extending portion 264 and the third extending portion 266. The first 245a, second 245b, and third 245c stiffener adjusting regions are spaced in a triangular configuration, such that the shape of the angled stiffening chamber 260, disposed partially between the stiffener adjusting regions 245a, 245b, 245c, resembles, somewhat, the letter "N." By increasing the size of the first stiffener adjusting region 245a while maintaining the size and location of the other stiffener adjusting regions 245b, 245c as illustrated, the width of the first bent portion 261, second extending portion 264, second bent portion 263, and third extending portion 266 may decrease. By adjusting the width of some components of the angled stiffening chamber 260, one may also adjust the rigidity of the curtain airbag 220 at or near the angled stiffening chamber 260 during a curtain airbag deployment event. The angled stiffening chamber 260 illustrated in FIG. 2A may have a width of approximately 20 cm, as measured from the closest points on the first stiffener adjusting region 245a and the second stiffener adjusting region 245b. In other embodiments, the width of the angled stiffening chamber 260, as measured by the above procedure, may be in the range of 10-20 cm or 20-30 cm.

It can be appreciated that an angled stiffening chamber may have fewer or more bent portions and/or extending portions than the embodiment depicted in FIG. 2A. For example, in some embodiments, the overall shape of an angled stiffening chamber may resemble somewhat the letter "M," the letter "W," the letter "V," or a "saw tooth" shape. In other embodiments, the width of an angled stiffening chamber may be greater or smaller than that of the embodiment depicted in FIG. 2A. For example, in some embodiments, adjusting the number of bent portions and the width of an angled stiffening chamber can be accomplished by the implementation of fewer or more stiffener adjusting regions, or by modifying the size and location of the stiffener adjusting regions. By adjusting the number, configuration, and/or position of the bent portions and extending portions, various characteristics of a deployed curtain airbag may be varied or otherwise configured, particularly in the area at or near the angled stiffening chamber.

An angled stiffening chamber, such as angled stiffening chamber 260, can more effectively accommodate shrinking in length direction and limit, direct, or control kinking or buckling of the curtain airbag in response to pressure of inflation gases and/or receiving an occupant. The bent portions allow expansion and contraction along a length of the curtain airbag without kinking or buckling. The stiffener adjusting regions defining the bent portions can also accommodate expansion and contraction along the length of the curtain airbag to limit or otherwise minimize kinking or buckling. In some embodiments, the bent portions direct, or otherwise ensure, any kinking or buckling is limited or controlled to be in an upward or downward direction so as to prevent undesired excursion of the airbag out of the vehicle, whether in response to inflation gas pressure and/or impact when receiving an occupant.

In some embodiments, a curtain airbag may include two or more standoff chambers configured to contact (e.g., abut) a roof rail and a beam at the bottom of a window instead of, or in addition to, one or more vehicle pillars. In yet other embodiments, an angled stiffening chamber may extend vertically or diagonally across a curtain airbag.

Figure 2B:
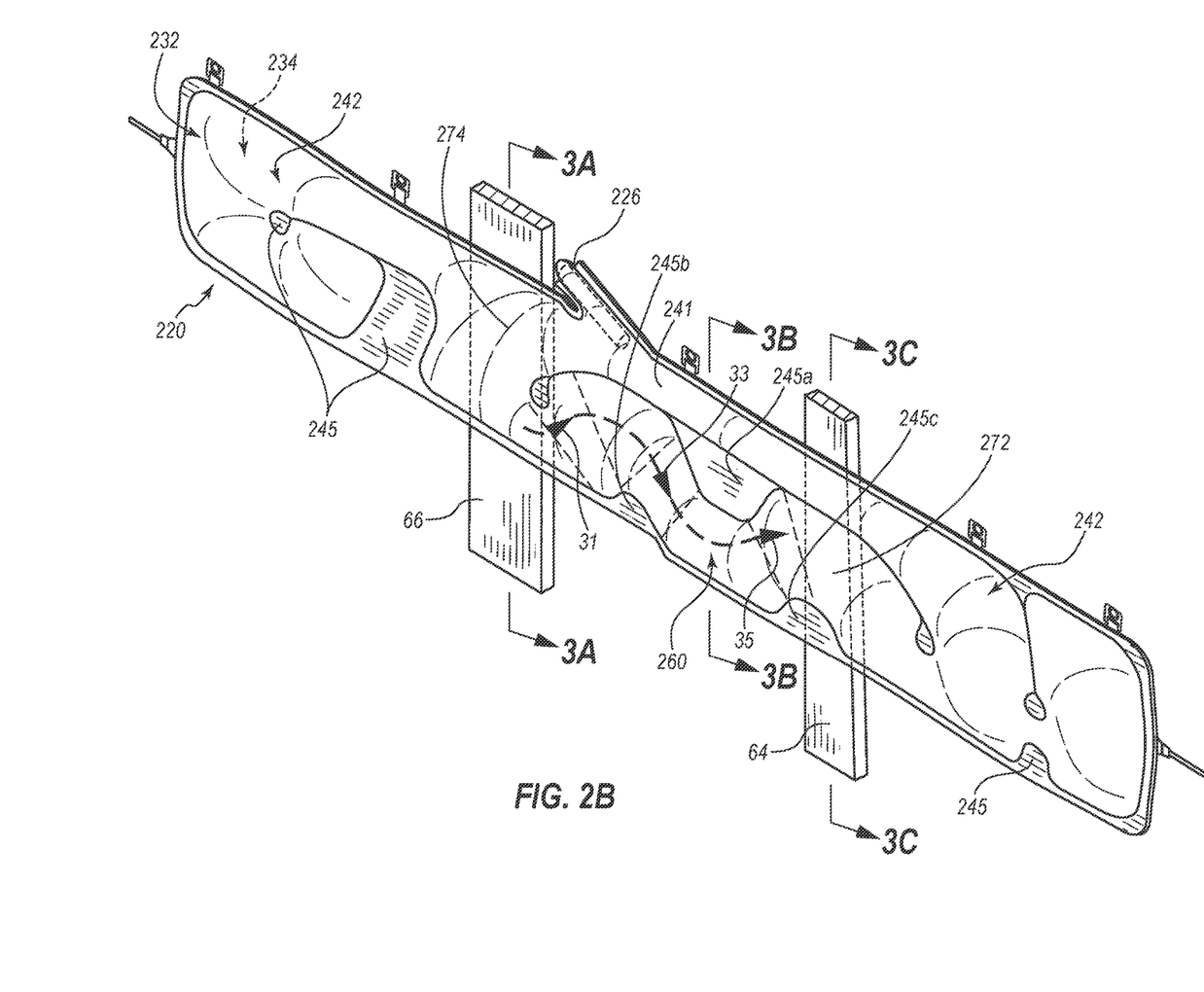
FIG. 2B is a perspective view of the deployed curtain airbag of FIG. 2A.

FIG. 2B is a perspective view of the curtain airbag 220 of FIG. 2A. As shown in FIG. 2B, the curtain airbag 220 is configured to deploy to span across the C-pillar 66 and the B-pillar 64 of the vehicle 50, such that the first standoff chamber 272 is configured to abut the B-pillar 64, and the second standoff chamber 274 is configured to abut the C-pillar 66. In the illustrated embodiment, the angled stiffening chamber 260 is disposed between, and in fluid communication with, the first standoff chamber 272 and the second standoff chamber 274.

Figure 3A:
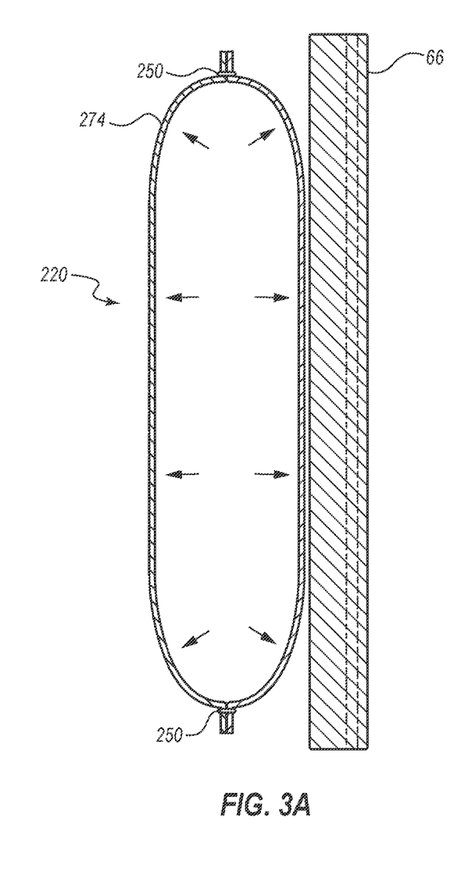
FIG. 3A is a cross-sectional view of the curtain airbag of FIG. 2A through line 3A-3A of FIG. 2B.

FIG. 3A is a cross-sectional view of the curtain airbag 220 through line 3A-3A of FIG. 2B, which is generally vertical through the second standoff chamber 274. The shape of the second standoff chamber 274 may be defined by one or more boundary seams 250 and/or stiffener adjusting regions 245 (see FIG. 2A). During deployment, inflation gas may enter the second standoff chamber 274, creating a pressure inside the second standoff chamber 274. The pressure from the inflation gas inside the second standoff chamber 274 may cause the second standoff chamber 274 to expand. The second standoff chamber 274 may become more rigid with increased pressure. A depth of the curtain airbag 220 can be easily viewed in FIG. 3A as a distance left to right in the drawing and between the panels of the curtain airbag. The height of the curtain airbag is viewed from top to bottom in FIG. 3A.

In the illustrated embodiment, the second standoff chamber 274 deploys to abut the C-pillar 66 of the vehicle 50. The C-pillar 66 may be a rigid and resilient structure of the vehicle 50 which is unlikely to break or shatter during a collision event, or which otherwise provides structural support and/or integrity of the vehicle. The C-pillar 66 may, therefore, provide support to the deployed second standoff chamber 274 during or after a collision.

Figure 3B:
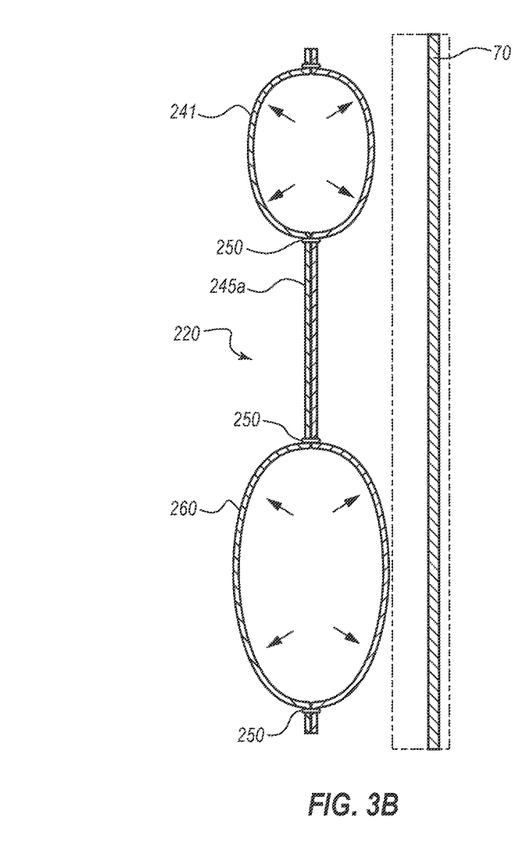
FIG. 3B is a cross-sectional view of the curtain airbag of FIG. 2A through line 3B-3B of FIG. 2B.

FIG. 3B is a cross-sectional view of the curtain airbag 220 through line 3B-3B of FIG. 2B. This view shows the angled stiffening chamber 260 and the longitudinal chamber 241 of the deployed curtain airbag 220. Additionally, FIG. 3B shows the angled stiffening chamber 260 at or near the second bent portion 263. The shapes of the angled stiffening chamber 260 and longitudinal chamber 241 may be defined by one or more boundary seams 250 and/or stiffener adjusting regions 245 (see FIG. 2A), such as the first stiffener adjusting region 245a. In the illustrated embodiment, the angled stiffening chamber 260 may deploy to abut or cover a window 70 of the vehicle 50. In some embodiments, the angled stiffening chamber 260 may not deploy to be in direct physical contact with the window 70, but may directly contact the window 70 if a force is applied to the deployed angled stiffening chamber 260. In some collision events, the window 70 may break or shatter, leaving an opening in the side of the vehicle 50. In the event the window 70 breaks, the deployed angled stiffening chamber 260 may cover, at least partially, the opening left from the broken window 70.

In the embodiment of FIG. 3B, the angled stiffening chamber 260 is connected to, and in fluid communication with, the second standoff chamber 274. The first stiffener adjusting region 245a is located above the angled stiffening chamber 260 at the second bent portion 263 (see FIG. 2A), and the longitudinal chamber 241 is spaced above the first stiffener adjusting region 245a. The stiffener adjusting region 245a at least partially configures or otherwise defines the volume, shape, and/or bends or angles of the angled stiffening chamber 260.

As can be seen in FIG. 3B, a depth of the curtain airbag 220 may vary from non-inflatable regions, such as the first stiffener adjusting region 245a, to inflatable regions, such as the angled stiffening chamber 260.

Figure 3C:
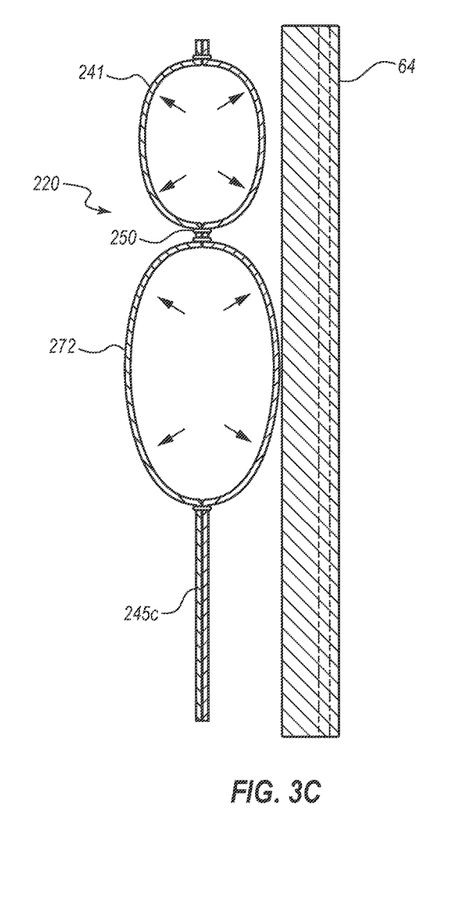
FIG. 3C is a cross-sectional view of the curtain airbag of FIG. 2A through line 3C-3C of FIG. 2B.

FIG. 3C is a cross-sectional view of the curtain airbag 220 through line 3C-3C of FIG. 2B. FIG. 3C shows the first standoff chamber 272 and the longitudinal chamber 241 of the curtain airbag 220. The first standoff chamber 272 is spaced above the third stiffener adjusting region 245c and below the longitudinal chamber 241 when deployed. A boundary seam 250 separates the first standoff chamber 272 from the longitudinal chamber 241. The first standoff chamber 272 is configured to deploy to abut the B-pillar 64 of the vehicle 50. As will be appreciated, in some embodiments, there may be no boundary seam separating a first standoff chamber from a longitudinal chamber.

Referring generally to FIGS. 3A to 3C, the angled stiffening chamber 260, which is connected to the first standoff chamber 272 abutting the C-pillar 66 and the second standoff chamber 274 abutting the B-pillar 64, may reduce the risk of occupant ejection in the event of occupant contact with the curtain airbag 220 during a collision or roll-over event.

Figure 4:
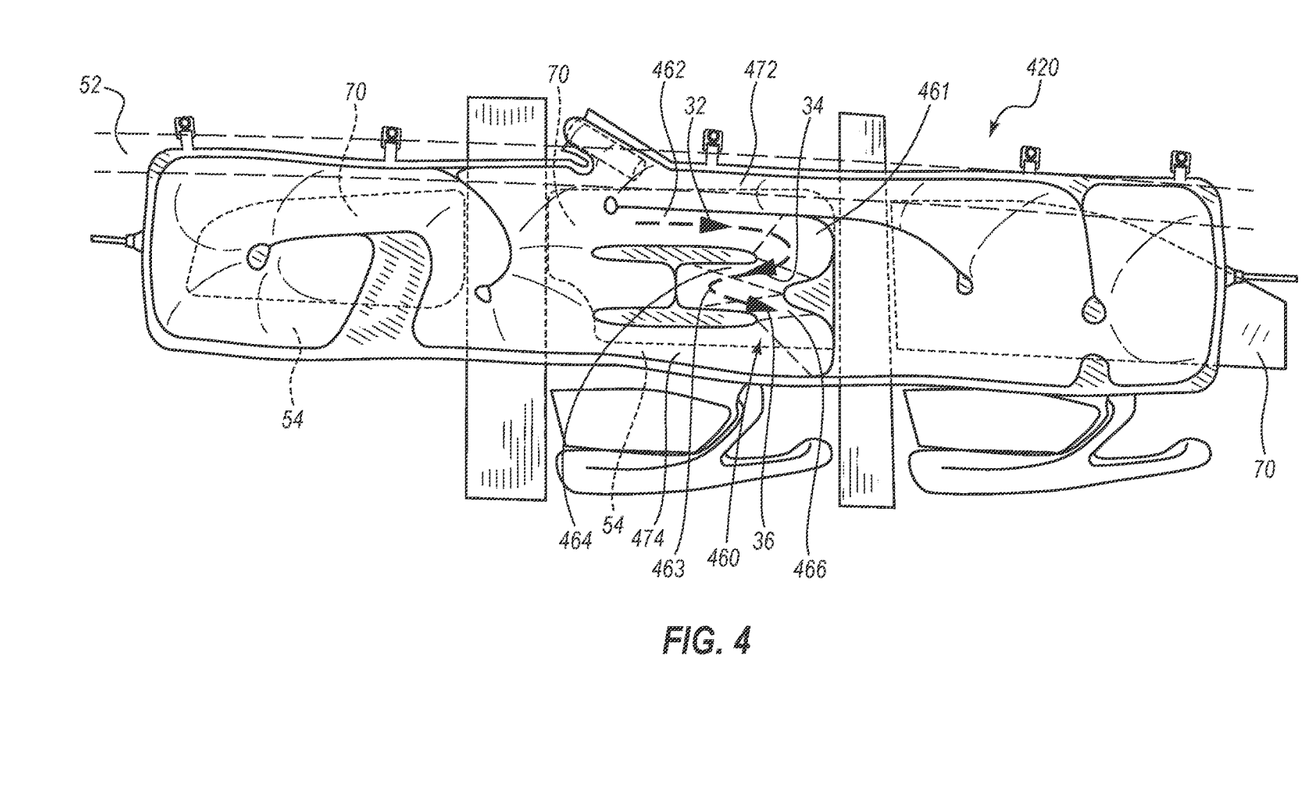
FIG. 4 is a front view of a deployed curtain airbag, according to another embodiment, in which the curtain airbag includes an angled stiffening chamber in a vertical orientation.
Figure 5:
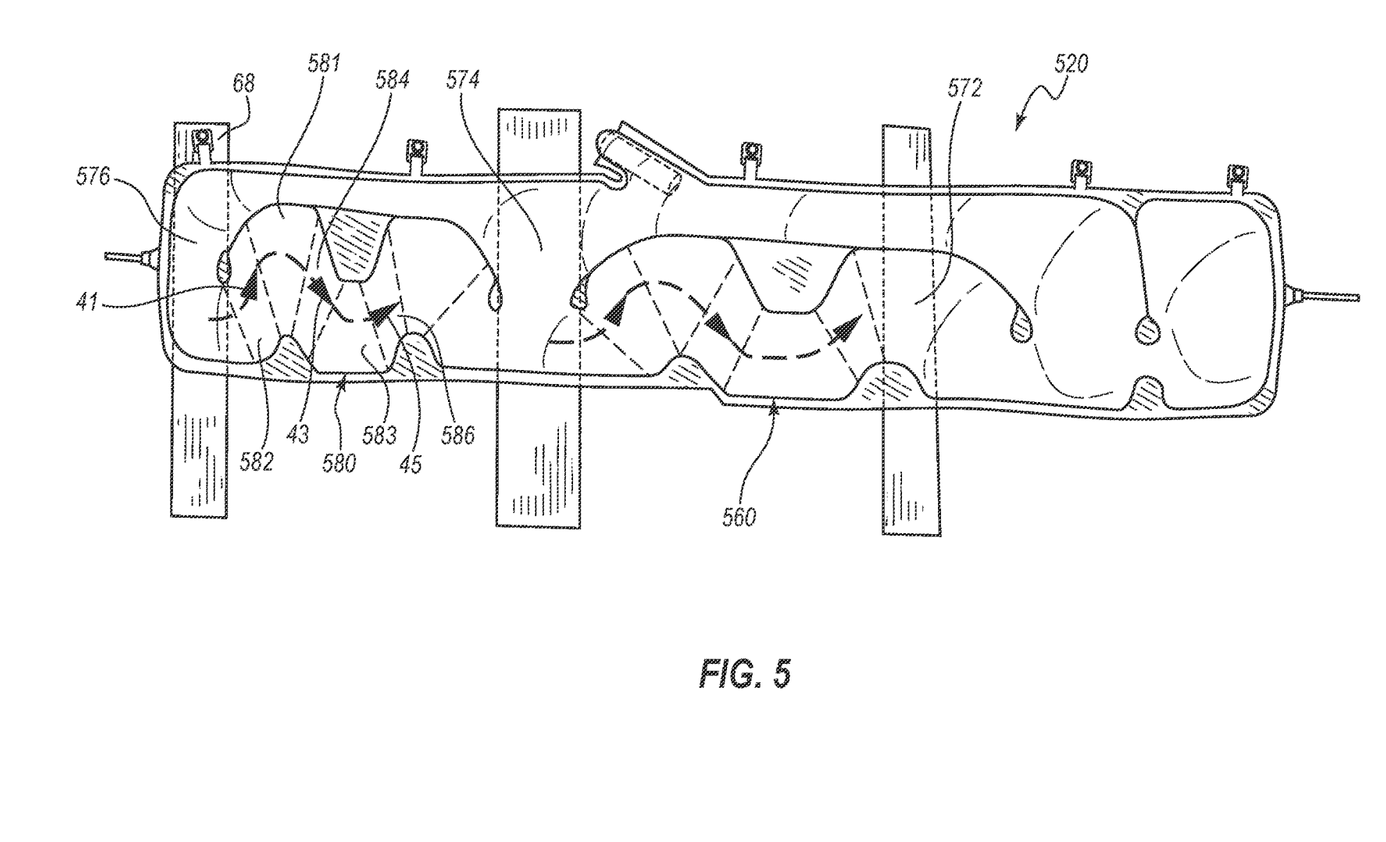
FIG. 5 is a front view of a deployed curtain airbag, according to another embodiment, in which the curtain airbag includes multiple angled stiffening chambers.
Figure 6:
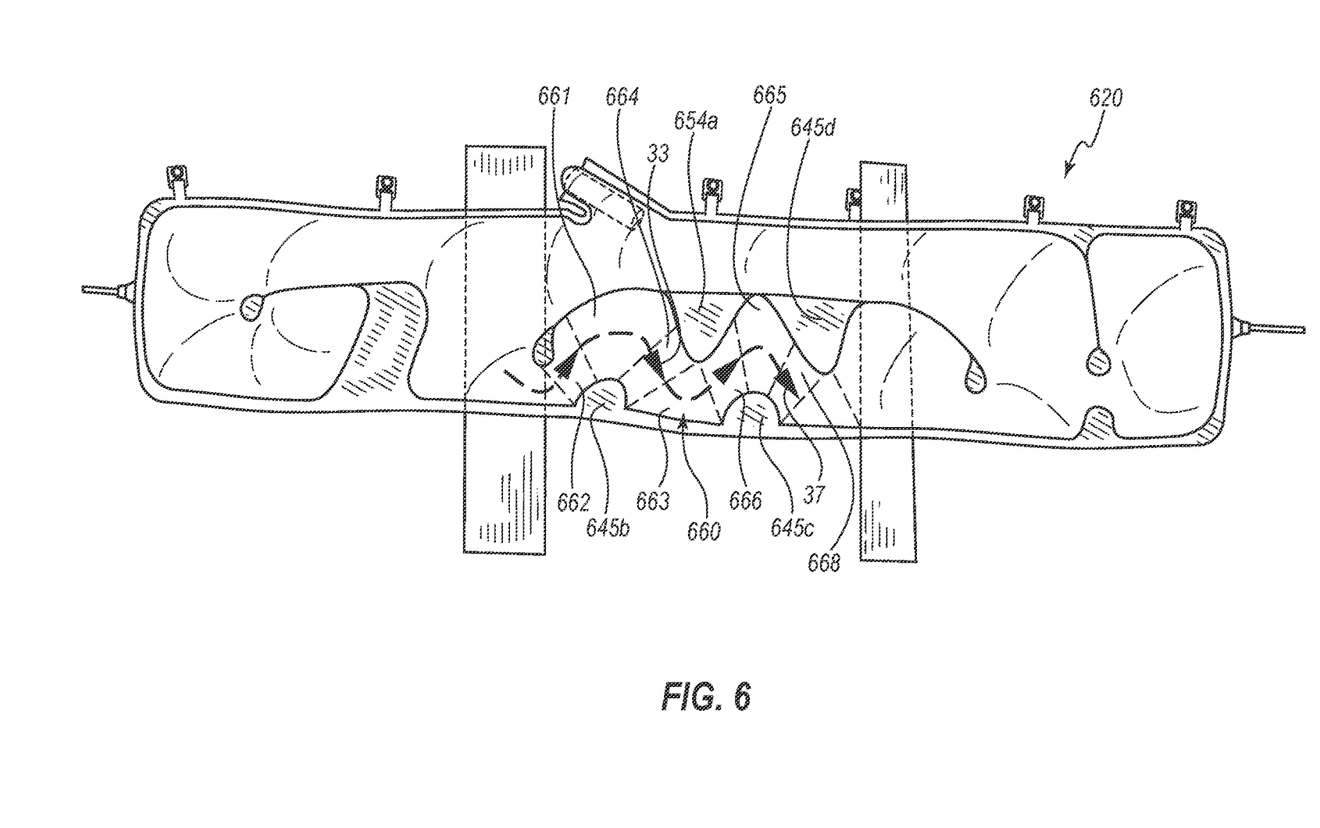
FIG. 6 is a front view of a deployed curtain airbag, according to another embodiment of the present disclosure.

FIGS. 4, 5, and 6 depict various other embodiments of a curtain airbag. The embodiments depicted in FIGS. 4, 5, and 6 may resemble the curtain airbags 120 and 220, and may be compatible with components of the curtain airbag assembly 100.

FIG. 4 depicts a curtain airbag 420 that includes a first standoff chamber 472, a second standoff chamber 474, and an angled stiffening chamber 460 in a vertical orientation. The first standoff chamber 472 is configured to deploy to abut the roof rail 52 of the vehicle 50. The roof rail 52 may provide support to the first standoff chamber 472 that is similar to the support provided by the C-pillar 66 to the first standoff chamber 272 in the embodiment depicted in FIGS. 2A and 2B.

The first standoff chamber 472 is connected to and in fluid communication with the angled stiffening chamber 460. The angled stiffening chamber 460 includes a first extending portion 462 extending in a first direction 32, a second extending portion 464 extending in a second direction 34, a third extending portion 466 extending in a third direction 36, a first bent portion 461, and a second bent portion 463. The first bent portion 461 is connected to, and disposed between, the first extending portion 462 and the second extending portion 464. The second bent portion 463 is connected to, and disposed between, the second extending portion 464 and the third extending portion 466. In the illustrated embodiment, the first bent portion 461 and second bent portion 463 alternate to define angles or curves that open toward the rear of the vehicle 50 and toward the front of the vehicle 50 respectively.

The angled stiffening chamber 460 shown in FIG. 4 is also connected to and in fluid communication with the second standoff chamber 474. The second standoff chamber 474 is configured to deploy to abut one or more beams 54 at the bottom of the window(s) 70 of the vehicle 50. Such beams 54 may provide support to the second standoff chamber 474 during or after deployment. In the illustrated embodiment, the first standoff chamber 472 and second standoff chamber 474 extend longitudinally, or substantially longitudinally. In other embodiments, the first standoff chamber 472 and second standoff chamber 474 may extend diagonally across the curtain airbag 420.

The angled stiffening chamber 460 may support and retain an occupant within the vehicle 50, thereby preventing (or reducing the risk of) occupant ejection during or after a deployment event. The angled stiffening chamber 460 may function together with the first standoff chamber 472 and the second standoff chamber 474 as a "cross beam," which is supported by the roof rail 52 and one or more beams 54 at the bottom of the window(s) 70.

FIG. 5 depicts another embodiment of a curtain airbag 520 that includes a first standoff chamber 572, a second standoff chamber 574, a third standoff chamber 576, a first angled stiffening chamber 560, and a second angled stiffening chamber 580. The third standoff chamber 576 is configured to deploy to abut the D-pillar 68 of the vehicle 50, while the first standoff chamber 572 and second standoff chamber 574 are configured similarly to the first standoff chamber 272 and second standoff chamber 274 of the curtain airbag 220 illustrated in FIGS. 2A and 2B. Furthermore, the first angled stiffening chamber 560 illustrated in FIG. 5 may be configured similarly to the angled stiffening chamber 260 illustrated in FIGS. 2A and 2B.

Referring to FIG. 5, the second angled stiffening chamber 580 is connected to, and in fluid communication with, the third standoff chamber 576 and the second standoff chamber 574. The second angled stiffening chamber 580 may be configured similarly to the first angled stiffening chamber 560. For example, the second angled stiffening chamber 580 includes a first extending portion 582 extending in a primary direction 41, a second extending portion 584 extending in a secondary direction 43, a third extending portion 586 extending in a tertiary direction 45, a first bent portion 581 and a second bent portion 583. The first bent portion 581 is connected to, and disposed between, the first extending portion 582 and the second extending portion 584. As in the first angled stiffening chamber 560, the first bent portion 581 and the second bent portion 583 alternate to define angles or curves that open toward the bottom of the vehicle 50 and the top of the vehicle 50, respectively. In other embodiments, the first bent portion 581 and second bent portion 583 of the second angled stiffening chamber 580 may define angles or curves which open toward the rear of the vehicle 50 and/or the front of the vehicle 50.

In the illustrated embodiment, the second angled stiffening chamber 580 has a shorter longitudinal span than the first angled stiffening chamber 560, which may accommodate for a somewhat shorter gap between the third standoff chamber 576 and the second standoff chamber 574 than the gap between the first standoff chamber 572 and the second standoff chamber 574. In other embodiments, the second angled stiffening chamber 580 may have a longitudinal span that is equal to, or longer than, the longitudinal span of the first angled stiffening chamber 560. In yet other embodiments, the second angled stiffening chamber 580 may be attached to the first angled stiffening chamber 560 to create a single angled stiffening chamber having more bent portions and extending portions than the angled stiffening chamber 260 depicted in FIGS. 2A and 2B.

FIG. 6 depicts another embodiment of a curtain airbag 620 that includes an angled stiffening chamber 660. In the depicted embodiment, the angled stiffening chamber 660 includes more bent portions and extending portions than the angled stiffening chamber 260 illustrated in FIGS. 2A and 2B. For example, in addition to the first extending portion 662, the second extending portion 664, the first bent portion 661, the second bent portion 663, and the third extending portion 666, the angled stiffening chamber 660 depicted in FIG. 6 further includes a third bent portion 665, and a fourth extending portion 668 extending in a fourth direction 37. In the illustrated embodiment, the second direction 33 is parallel, or substantially parallel to the fourth direction 37. The geometric configuration of the angled stiffening chamber 660 may be defined and/or adjusted by a plurality of stiffener adjusting regions 645a, 645b, 645c, 645d. The third bent portion 665 and fourth extending portion 668 may be created or defined by the addition of a fourth stiffener adjusting region 645d.

It will be appreciated that, in other embodiments, a curtain airbag may include an angled stiffening chamber that includes more bent portions and/or extending portions than the embodiment depicted in FIG. 6. The addition of more bent portions and extending portions may adjust the physical characteristics or behavior of the curtain airbag during deployment, such as its rigidity and/or cushioning ability.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. A curtain airbag assembly for use in a vehicle, the curtain airbag assembly comprising:
   an airbag inflator configured to expel an inflation gas; and
   a curtain airbag configured to receive the inflation gas from the airbag inflator, the curtain airbag comprising:
      a first standoff chamber configured to contact a roof rail above a window of the vehicle during a curtain airbag deployment event; and
      an angled stiffening chamber disposed adjacent to and in fluid communication with the first standoff chamber, the angled stiffening chamber configured to span across a window opening of the vehicle during the curtain airbag deployment event, the angled stiffening chamber comprising:
         an opening to receive inflation gas from the first standoff chamber,
         a first extending portion extending in a first direction;
         a second extending portion extending in a second direction that differs from the first direction;
         a first bent portion disposed between and in fluid communication with the first extending portion and second extending portion; and
         a second bent portion disposed adjacent to and in fluid communication with the second extending portion; and
      a plurality of stiffener adjusting regions configured to at least partially define one or more of the first bent portion, the second bent portion, the first extending portion, and the second extending portion; and
      a second standoff chamber configured to contact a beam at the bottom of the window of the vehicle during the curtain airbag deployment event, wherein the second standoff chamber is disposed adjacent to and in fluid communication with the angled stiffening chamber, and the angled stiffening chamber extends in a generally vertical direction between the first standoff chamber and second standoff chamber.

2. The curtain airbag assembly of claim 1, wherein:
   the first standoff chamber is configured to contact a first pillar of the vehicle during the curtain airbag deployment event;
   the second standoff chamber is configured to contact a second pillar of the vehicle during the curtain airbag deployment event; and
   the angled stiffening chamber extends in a generally horizontal direction between the first standoff chamber and the second standoff chamber.

3. The curtain airbag assembly of claim 2, wherein the curtain airbag further comprises an elongate gas entry chamber disposed adjacent to the angled stiffening chamber, wherein the elongate gas entry chamber extends between the first standoff chamber and the second standoff chamber when the curtain airbag is in a deployed state.

4. The curtain airbag assembly of claim 1, wherein the angled stiffening chamber further comprises a third extending portion that extends from the second bent portion in a third direction that differs from the second direction when the angled cushion airbag is in a deployed state.

5. The curtain airbag assembly of claim 4, wherein the third extending portion extends to and is in fluid communication with the second standoff chamber.

6. The curtain airbag assembly of claim 4, wherein the angled stiffening chamber further comprises:
   a third bent portion, wherein the third extending portion extends from the second bent portion to the third bent portion; and
   a fourth extending portion that extends from the third bent portion in a fourth direction that differs from the third direction.

7. The curtain airbag assembly of claim 6, wherein the fourth extending portion extends to and is in fluid communication with the second standoff chamber.

8. The curtain airbag assembly of claim 6, wherein the first direction and the third direction are substantially parallel to one another.

9. The curtain airbag assembly of claim 6, wherein the second direction and the fourth direction are substantially parallel to one another.

10. The curtain airbag assembly of claim 1, further comprising a second angled stiffening chamber comprising:
    an opening to receive inflation gas from the first standoff chamber of the curtain airbag;
    a primary extending portion extending in a primary direction;
    a secondary extending portion extending in a secondary direction;
    a primary bent portion disposed between and in fluid communication with the primary extending portion and the secondary extending portion; and
    a secondary bent portion disposed adjacent to and in fluid communication with the secondary extending portion.

11. The curtain airbag assembly of claim 1, wherein one or more of the first bent portion and second bent portion have a trapezoidal shape or are shaped like a section of a toroid.

12. The curtain airbag assembly of claim 1, wherein the plurality of stiffener adjusting regions comprises three stiffener adjusting regions spaced in a triangular relationship, each stiffener adjusting region being separated from the other stiffener adjusting regions by the angled stiffening chamber.

13. The curtain airbag assembly of claim 1, wherein the curtain airbag is configured to extend along a side of the vehicle when in a deployed state.

14. A curtain airbag assembly for use in a vehicle, the curtain airbag assembly comprising:
    an airbag inflator configured to expel an inflation gas;
    a curtain airbag configured to receive the inflation gas from the airbag inflator, the curtain airbag comprising:
        a first inflatable standoff chamber configured to deploy to contact a first beam or pillar of the vehicle during a curtain airbag deployment event; and
        an inflatable angled stiffening chamber configured to deploy to span across a window opening of the vehicle, the inflatable angled stiffening chamber disposed adjacent to and in fluid communication with the first inflatable standoff chamber;
        a first non-inflatable stiffener adjusting region disposed on a first side of the inflatable angled stiffening chamber to define a first bend in the inflatable angled stiffener chamber; and
        a second non-inflatable stiffener adjusting region disposed on a second side of the inflatable angled stiffening chamber opposite and longitudinally displaced from the first non-inflatable stiffener adjusting region, wherein the second non-inflatable stiffener adjusting region defines a second bend in the inflatable angled stiffening chamber.

15. The curtain airbag assembly of claim 14, further comprising a second inflatable standoff chamber configured to deploy to contact a second beam or pillar of the vehicle.

16. The curtain airbag assembly of claim 15, wherein the inflatable angled stiffening chamber is disposed between the first standoff chamber and the second standoff chamber.

17. The curtain airbag assembly of claim 16, wherein the curtain airbag further comprises a longitudinal chamber disposed adjacent the angled stiffening chamber, the longitudinal chamber extending between the first standoff chamber and the second standoff chamber.

18. The curtain airbag assembly of claim 17, wherein the curtain airbag further comprises a third non-inflatable stiffener adjusting region disposed on the first side of the inflatable angled stiffening chamber longitudinally displaced from the first stiffener adjusting region and the second stiffener adjusting region, wherein the third stiffener adjusting region defines a third bend in the angled stiffening chamber.

* * * * *